Figure 1:
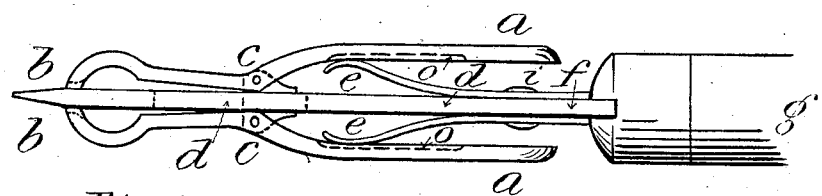

(Model.)

A. McLELLAN.
SCREW DRIVER.

No. 280,845.                    Patented July 10, 1883.

Witnesses,                    Inventor,

W. R. Trowell                 Angus McLellan.

C. B. Talbot.

UNITED STATES PATENT OFFICE.

ANGUS McLELLAN, OF PORTLAND, OREGON.

SCREW-DRIVER.

SPECIFICATION forming part of Letters Patent No. 280,845, dated July 10, 1883.

Application filed April 12, 1883. (Model.)

*To all whom it may concern:*

Be it known that I, ANGUS MCLELLAN, of Portland, in the county of Multnomah, in the State of Oregon, have invented an Improved Screw-Driver, of which the following is a specification.

The nature or object of my invention is to hold small screws and drive them in corners or inconvenient places where the screws cannot be easily held in the fingers. For this purpose I have designed the device shown in the drawings.

Figure 2:
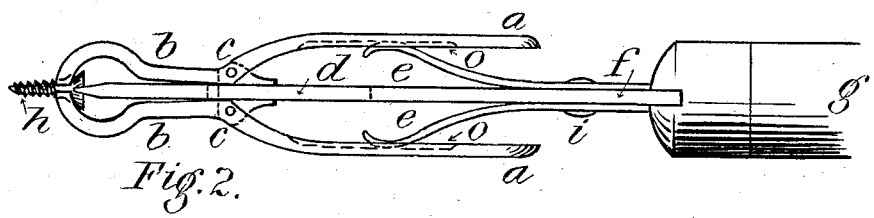
Figure 3:
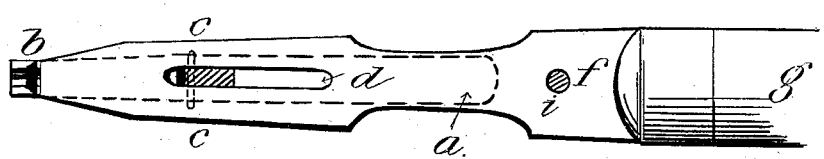

In Figure 1 is shown the whole as in use for a common screw-driver, the nippers being drawn back on the shaft of the driver. In Fig. 2 the nippers are advanced beyond the end of the driver and engage a common wood-screw in the jaws, while the end of the driver is in the slot of the same, ready to drive. Figs. 1 and 2 are side elevations; and Fig. 3, a plan showing the slot and parts of the driver, the overlying nipper or jaw being removed, and the under one represented by full and dotted lines under the driver. The scale is about full size.

To use the driver, the handles $a\ a$ are pressed by the thumb and finger, opening the nippers $b$, and at the same time the same is advanced beyond the end of the driver $f$, when a screw is inserted between the nippers, the slot in the screw-head being set in place on the end of the driver. In this position (shown in Fig. 2) the screw may be pushed into the wood by the hand on the handle $g$, and, so started, may be driven in the usual way until nearly home, when the nippers are disengaged and drawn back in the position shown in Fig. 1. The nippers are hinged at $c$ to a guide moving in the slot $d$, the guide being a flat piece of metal moving freely in the slot, having pin-holes for inserting the pins, on which the nippers move at the center. There is a small slot in each nipper at $c$, in which this guide is placed. In addition to this, there are two springs, $e$, placed under the handles $a$, springing them apart. The free or moving ends of these springs run in grooves $o$ in the inside of each handle $a$, which assist also in keeping the nippers and handles in line and in place as they run out or in in the slot $d$. The springs $e$ are riveted to the driver at $i$, on each side, and are sufficiently strong to hold the screws placed in the jaws of the nippers $b$. The jaws of the nippers are countersunk to correspond with the usual shape of the screw-heads, and the parts engaging with the shank of the screw below the head are V-shaped to fit any screw placed in it smaller than themselves.

I claim—

The nippers $b$, moving, as described, in a slot, $d$, and closed by the springs $e$, the same being in combination with the slotted screw-driver $f$, substantially as described, and for the purpose set forth.

ANGUS McLELLAN.

Witnesses:
W. P. TREADWELL,
C. B. TALBOT.